US006826415B2

(12) United States Patent
Rademacher et al.

(10) Patent No.: US 6,826,415 B2
(45) Date of Patent: Nov. 30, 2004

(54) SYSTEM FOR A MOBILE RADIO SYSTEM HAVING A BASE STATION AND AN ANTENNA DEVICE

(75) Inventors: Leo Rademacher, Holzkirchen (DE); Mohamed Shaalan, Munich (DE); Hans Rudolf, Mainz (DE)

(73) Assignee: Siemens Aktiengesellschaft, Munich (DE)

( * ) Notice: Subject to any disclaimer, the term of this patent is extended or adjusted under 35 U.S.C. 154(b) by 465 days.

(21) Appl. No.: 10/074,252

(22) Filed: Feb. 14, 2002

(65) Prior Publication Data

US 2002/0111147 A1 Aug. 15, 2002

(30) Foreign Application Priority Data

Feb. 14, 2001 (DE) .......................................... 101 06 821
Feb. 14, 2001 (EP) ............................................. 01103432

(51) Int. Cl.[7] .............................................. H04M 1/00
(52) U.S. Cl. .................... 455/562.1; 455/560; 455/561; 455/101
(58) Field of Search ...................... 455/101, 91, 562.1, 455/560, 561, 272, 273, 276.1, 279.1; 343/700 R, 725, 729; 342/373, 374

(56) References Cited

U.S. PATENT DOCUMENTS 3,858,218 A * 12/1974 Masak et al. ................ 342/406
4,652,879 A * 3/1987 Rudish et al. ............... 342/371
4,882,588 A * 11/1989 Renshaw et al. ............ 342/373
5,179,386 A * 1/1993 Rudish et al. ............... 342/371
5,610,617 A * 3/1997 Gans et al. .................. 342/373
5,854,611 A * 12/1998 Gans et al. .................. 342/373
6,243,038 B1 * 6/2001 Butler et al. ................. 342/373
6,421,543 B1 * 7/2002 Molnar ..................... 455/562.1

FOREIGN PATENT DOCUMENTS

| DE | 19820460 A1 | 12/1999 |
| EP | 1 069 706 A1 | 1/2001 |
| WO | WO 97/28615 | 8/1997 |
| WO | WO 00/67343 | 11/2000 |

OTHER PUBLICATIONS

Lehne et al., "An Overview of Smart Antenna Technology for Mobile Communications Systems", IEEE Communications Survey, Fourth Quarter 1999, vol. 2, No. 4.

Godara, "Applications of Antenna Arrays to Mobile Communications, Part I: Performance Improvement, Feasibility, and System Considerations", Processings of the IEEE, vol. 85, No. 7, Jul. 1997.

* cited by examiner

*Primary Examiner*—Sonny Trinh
(74) *Attorney, Agent, or Firm*—Staas & Halsey LLP

(57) ABSTRACT

A circuit arrangement for a mobile radio system has a base station and a non-adaptive antenna device. The base station has n outputs for n carrier-frequency signals which have essential the same frequency and amplitude. These n signals are adapted to the operation of a non-adaptive antenna device using devices for dividing and combining signals, if appropriate which perform phase correction.

8 Claims, 3 Drawing Sheets

SYSTEM FOR A MOBILE RADIO SYSTEM HAVING A BASE STATION AND AN ANTENNA DEVICE

CROSS REFERENCE TO RELATED APPLICATIONS

This application is based on and hereby claims priority to German Application No. 10106821.2 filed on Feb. 14, 2001 and European Application No. 01103432.9 filed on Feb. 14, 2001, the contents of which are hereby incorporated by reference.

BACKGROUND OF THE INVENTION

The invention relates to an arrangement for a mobile radio system having a base station with n outputs whose signals have essentially the same frequency and amplitude, and an antenna device.

The article "An Overview of Smart Antenna Technology for Mobile Communications Systems" from IEEE Communications Surveys, Fourth Quarter 1999, Vol. 2, No. 4 discloses base stations with n ports in which the signals which occur there are preferably used for the operation of an adaptive antenna arrangement which is composed of n individual antennas.

Here, for example in the case of transmission, a signal to be transmitted is divided within the base station in such a way that the n ports of the base station have essentially the same amplitude and frequency with different phase angles. Each of these signals is passed on to an individual antenna of an adaptive antenna arrangement and irradiated as a transmission signal. As a result of the different phase angles of the individual signals of the base station, and thus of the transmission signals of the individual antennas, a composite radiation diagram of the adaptive antenna arrangement is formed which has a preferential spatial direction.

As a result of the number n of the individual antennas of the adaptive antenna arrangement, it is possible to shape the composite radiation diagram of the adaptive antenna. As a result of the selection of different carrier frequencies and of the phase angles between the signals of the base station, it is possible to generate a plurality of mutually independent composite radiation diagrams of the adaptive antenna arrangement, each individual diagram of which has its own preferential spatial direction. The capacity of a radio network can be increased in this way.

The dimensions of an adaptive antenna arrangement are frequency-dependent and typically occur within the range from approximately 0.5 to 1.5 m in width and in the range of approximately 0.5 to 1.5 m in height. However, some preferred locations for antennas are not suitable for adaptive antenna arrangements of this size. If a location for an antenna is situated, for example, on an historical building, it can often not be used as a location for such large antenna arrangements for aesthetic reasons or because of laws protecting historical buildings. The statistics of the locations for antennas, which are only available in limited numbers, often prohibit the use of an adaptive antenna arrangement, for example owing to the wind load or the weight of the antenna arrangement.

For this reason, generally relatively small, and thus less conspicuous, individual antennas are provided for use at these locations. However, for such antennas it would be necessary to develop and produce individual base stations which would have to be suitable for the operation of non-adaptive antennas. As a result of the often only small production numbers, this would lead to an increased level of expenditure on development and fabrication.

Therefore, one object of the present invention is to adapt a base station with n ports whose signals have essentially the same frequency and amplitude to a non-adaptive antenna device.

SUMMARY OF THE INVENTION

The invention comprises two preferred arrangements for a mobile radio system having a base station and having an antenna device.

In a first preferred arrangement, the base station is composed of n ports which are decoupled from one another and to which signals which have essentially the same frequency and amplitude but different phase angles are fed.

The base station contains a digital signal controller which, in the case of transmission, divides a digital signal to be transmitted into n individual digital signals which have essentially the same amplitude and frequency but have different phase angles, and which, in the case of reception, forms a composite reception signal with a uniform phase angle from the n individual signals.

The base station also contains a device for converting, in the case of transmission, these n individual signals of the signal controller into n analog, carrier-frequency radio signals for the n ports of the base station which are decoupled from one another. In the case of reception, the n analog, carrier-frequency radio signals are converted in the opposite direction into the n digital individual signals which have essentially the same amplitude and frequency but different phase angles, and which are then fed to the digital signal controller.

In order to connect this base station to a non-adaptive antenna device, a device for combining or dividing is arranged between the base station and the antenna device, which device for combining or dividing connects to one another, in the case of transmission, the radio signals which occur at the n ports of the base station and which have essentially the same amplitude and frequency but different phase angles, in such a way that a composite signal which occurs at one of the ports of the device for combining or dividing and has a uniform phase angle is produced and is fed as an antenna signal to the antenna device, and which device for combining or dividing divides, in the case of reception, the antenna signal of the antenna device, said signal being fed as a composite signal with uniform phase angle to the device for combining or dividing, into the n radio signals which have essentially the same frequency and amplitude but different phase angles and which are then fed to the n ports of the base station.

The device for combining or dividing advantageously contains a Butler matrix which has n ports for the radio signals of the base station and m ports for the antenna signals or composite signals, the composite signal or the antenna signal being fed to just one of the m ports and all the other m ports each being terminated with a terminating resistor. A Butler matrix of the type described here is known, for example, from the "Taschenbuch der Hochfrequenztechnik" by Meinke-Gundlach, fourth edition, year of publication 1986.

The radio signals of the base station advantageously have an essentially linearly rising phase angle with respect to one another.

In a second preferred arrangement for a mobile radio system having a base station and having an antenna device, the base station has n ports which are decoupled from one another and to which signals which have essentially the same frequency, amplitude and phase angle are fed.

The base station contains a digital signal controller which, in the case of transmission, divides a digital signal to be transmitted into n individual digital signals which have essentially the same amplitude, frequency and phase angle and which, in the case of reception, forms a composite reception signal with a uniform phase angle from the n individual signals.

The base station contains here a device for converting, in the case of transmission, the n individual signals of the signal controller into n analog, carrier-frequency radio signals for the n ports of the base station which are decoupled from one another. In the case of reception, the n analog, carrier-frequency radio signals which are fed to the n ports of the base station which are decoupled from one another are converted into the n individual digital signals and fed to the signal controller. The conversion is carried out using digital/analog converters and modulating and mixing devices, and with filters.

In order to connect the base station to a non-adaptive antenna device, a device for combining or dividing is arranged between the base station and the antenna device, which device for combining or dividing connects to one another, in the case of transmission, the radio signals which occur at the n ports of the base station and which have essentially the same amplitude, frequency and phase angle, in such a way that a composite signal which occurs at one of the ports of the device for combining or dividing and has a uniform phase angle is produced and is fed as an antenna signal to the antenna device, and which device for combining or dividing divides, in the case of reception, the antenna signal of the antenna device, said signal being fed as a composite signal with uniform phase angle to the device for combining or dividing, into the n radio signals which have essentially the same frequency, amplitude and phase angle and passes them on to the n ports of the base station.

In a preferred embodiment, the device for combining or dividing contains at least one Wilkinson combiner, which is known, for example, from the book "RF Design Guide" by Peter Vizmuller, year of publication 1995.

In the two preferred arrangements described, the antenna device contains just one port at which the antenna signal or the composite signal is present. In this context, the antenna device can be implemented either as an individual antenna or as a group antenna.

The invention adapts a base station, which has n decoupled ports whose signals have essentially the same amplitude and frequency, to a non-adaptive antenna device. This avoids the need for a further fabrication line for base stations which would have to be specially developed for the operation of a non-adaptive antenna.

If, as in the reception case described above, an antenna signal is divided into n analog, carrier-frequency radio signals, processed and combined again, the signal-to-noise ratio is typically improved by a factor of two as a result of the coherent combination of the individual signals.

As a result of the preferred use a Butler matrix or at least one "Wilkinson combiner" the individual signals are combined and respectively divided essentially without loss.

As a result of the combination of n carrier-frequency individual signals to form a composite signal in the case of transmission, relatively small gain factors may be used for the individual signals. The power amplifiers used typically have linear gain characteristic curves here, as a result of which interference frequencies within the mobile radio system are avoided.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
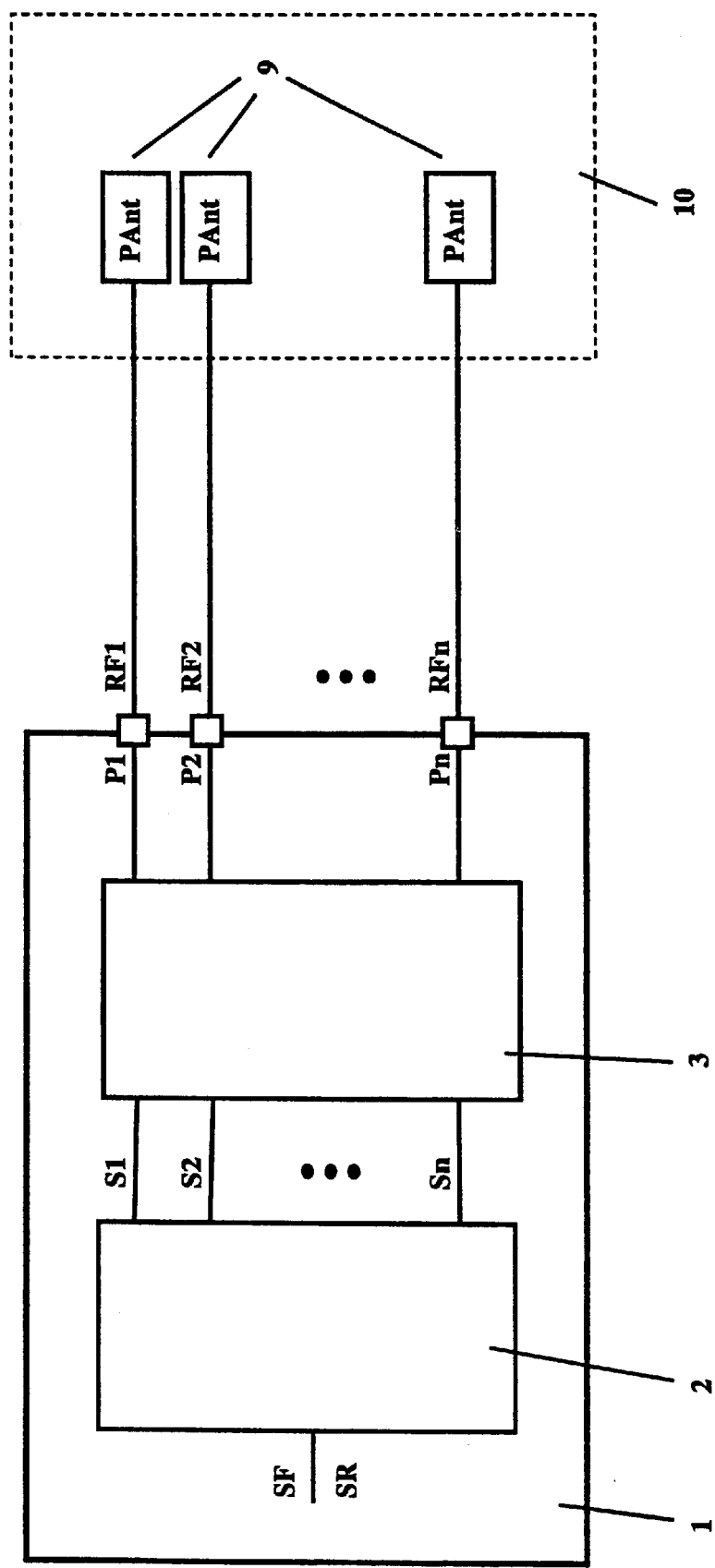
FIG. 1 shows an arrangement for a mobile radio system having a base station and an antenna device according to the prior art.

Reference will now be made in detail to the preferred embodiments of the present invention, examples of which are illustrated in the accompanying drawings, wherein like reference numerals refer to like elements throughout.

FIG. 1 shows an arrangement for a mobile radio system having a base station 1 and an adaptive antenna device 10 according to the prior art. The base station 1 contains a digital signal controller 2, a signal converter device 3 and n ports P1, P2, . . . , Pn which are decoupled with respect to one another. The adaptive antenna device 10 contains n individual antennas 9.

The digital signal controller 2 divides, in the case of transmission, a digital signal SF to be transmitted into n individual digital signals S1, S2, . . . , Sn which have essentially the same amplitude and frequency but different phase angles, and forms, in the case of reception, a composite reception signal SR with a uniform phase angle from said n individual signals S1, S2, . . . , Sn. The signal converter device 3 forms a total of n analog, carrier-frequency radio signals RF1, RF2, . . . , RFn for the ports P1, P2, . . . , Pn of the base station 1 which are decoupled from one another from the n individual digital signals S1, S2, . . . , Sn of the signal controller 2, and vice versa.

The n analog, carrier-frequency radio signals RF1, RF2, . . . , RFn are each fed to an individual antenna 9 of the adaptive antenna device 10 and form, by their phase angle, a composite radiation diagram with a preferential spatial direction.

Figure 2:
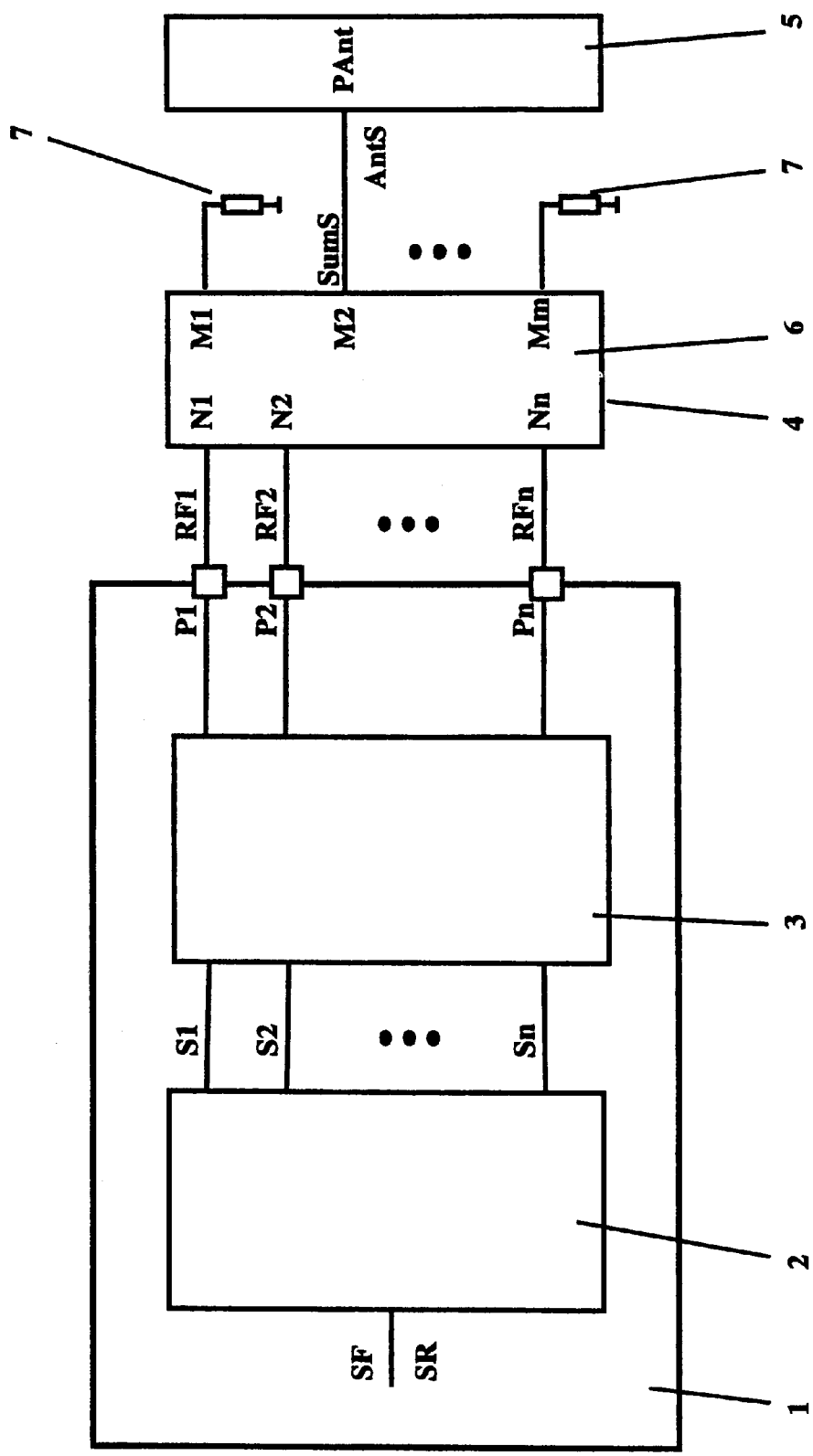
FIG. 2 shows an arrangement for a mobile radio system having a base station and an antenna device in a first preferred embodiment according to the invention.

FIG. 2 shows an arrangement for a mobile radio system having a base station 1 according to FIG. 1, an antenna device 5 and a device 4 for combining or dividing in a first preferred embodiment according to the invention. N analog, carrier-frequency radio signals RF1, RF2, . . . , RFn, which are fed to the n ports P1, P2, . . . , Pn, decoupled with respect to one another, of the base station 1, which has already been described in detail in conjunction with FIG. 1, are, in the case of transmission, connected to one another by the device 4 for combining or dividing, in such a way that a composite signal SumS which occurs at one of the ports M2 of the device 4 and has a uniform phase angle is produced and is fed, as antenna signal AntS to the antenna device 5. In the case of reception, the antenna signal AntS of the antenna device 5, said signal being fed as a composite signal SumS with uniform phase angle to the device 4 for combining or dividing, is divided into the n radio signals RF1, RF2, ..., RFn which have essentially the same frequency and amplitude but different phase angles and which are then fed to the n ports P1, P2, ..., Pn of the base station 1.

The device 4 for combining or dividing is advantageously composed of a Butler matrix 6 with n ports N1, N2, ..., Nn for the radio signals RF1, RF2, ..., RFn of the base station 1 and m ports M1, M2, ..., Mn for antenna signals AntS or composite signals SumS, the composite signal SumS or the antenna signal AntS being fed to just one of the m ports M2 and all the other ports M1, ..., Mn each being terminated with a terminating resistor 7. In this context, the radio signals RF1, RF2, ..., RFn advantageously have an essentially linearly rising phase angle with respect to one another.

The antenna signal AntS is radiated via the antenna device 5, which contains just one port. In this context, the antenna device 5 can be implemented either as an individual antenna or as a group antenna.

Figure 3:
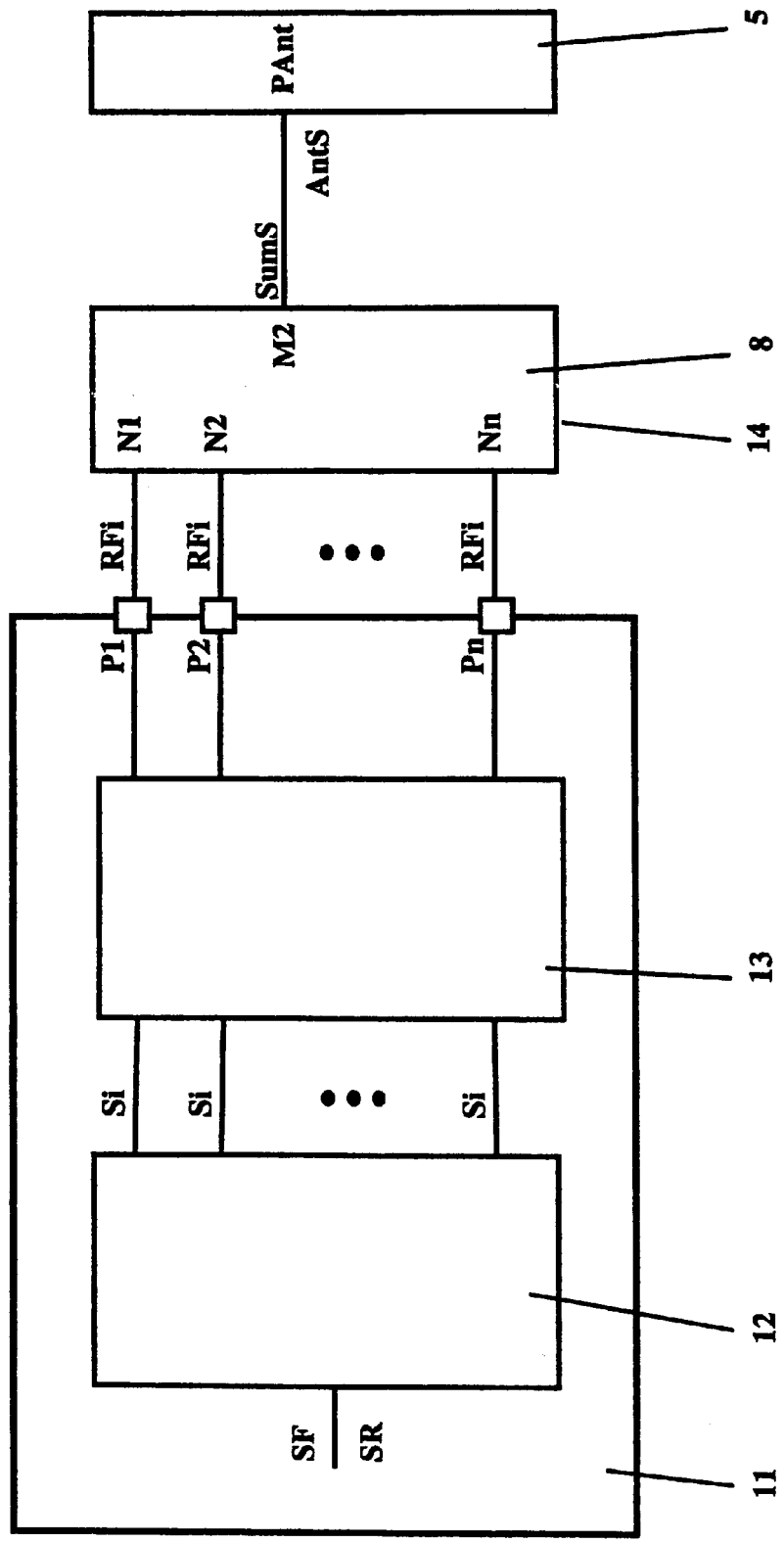
FIG. 3 shows an arrangement for a mobile radio system having a base station and an antenna device in a second preferred embodiment according to the invention.

FIG. 3 shows an arrangement for a mobile radio system with a base station 11 which contains a digital signal controller 12, a signal converter device 13 and n ports P1, P2, ..., Pn which are decoupled with respect to one another, with an antenna device 5 and with a device 14 for combining or dividing in a second preferred embodiment according to the invention.

The digital signal controller 12 divides, in the case of transmission, a digital signal SF to be transmitted into n individual digital signals Si which have essentially both the same amplitude and frequency and the same phase angle, and forms, in the case of reception, a composite reception signal SR with uniform phase angle from these n individual signals Si. The signal converter device 13 forms a total of n analog, carrier-frequency radio signals RFi for the ports P1, P2, ..., Pn of the base station 11 which are decoupled with respect to one another from the n individual signals Si of the signal controller 12, and vice versa.

In the case of transmission, the n analog, carrier-frequency radio signals RFi of the n ports P1, P2, ..., Pn of the base station 11 which are decoupled with respect to one another are connected to one another by the device 14 for combining or dividing, in such a way that a composite signal SumS which occurs at one of the ports M2 of the device 14 for combining or dividing and has a uniform phase angle is produced, and said signal is fed, as an antenna signal AntS, to the antenna device 5. In the case of reception, the antenna signal AntS of the antenna device 5, said signal being fed as a composite signal SumS with the uniform phase angle to the device 14 for combining or dividing, is divided into the n radio signals RFi which have essentially the same frequency, amplitude and phase angle and which are fed to the n ports P1, P2, ..., Pn of the base station 11.

The device 14 for combining or dividing advantageously contains at least one Wilkinson combiner 8, which is used to combine two signals in each case.

The signal converter device 13 uses a digital/analog converter, a mixer device and a modulation device to form n analog, carrier-frequency radio signals RFi from the n individual signals Si of the signal controller, and vice versa.

The antenna signal AntS is irradiated by the antenna device 5, which contains just one port PAnt. In this context, the antenna device can be implemented either as an individual antenna or as a group antenna.

The invention has been described in detail with particular reference to preferred embodiments thereof and examples, but it will be understood that variations and modifications can be effected within the spirit and scope of the invention.

What is claimed is:

1. A system for a mobile radio system having a base station and an antenna device, comprising:
   a digital signal controller provided in the base station which, in the case of transmission, divides a digital signal to be transmitted into n individual digital signals which have essentially the same amplitude and frequency but have different phase angles, and which, in the case of reception, forms a composite reception signal with a uniform phase angle from the n individual signals;
   n ports provided in the base station;
   a device provided in the base station to convert the n individual signals of the signal controller into n analog, carrier-frequency radio signals for the n ports of the base station and vice versa, the carrier frequency radio signals having essentially the same frequency and amplitude, but different phase angles decoupled from one another;
   a combination/division device having a port and arranged between the base station and the antenna device to connect the base station and the non-adaptive antenna device such that in the case of transmission, the carrier frequency radio signals are combined to form a composite signal which is provided to the port of the combination/division device and fed to the antenna device as an antenna signal, the composite signal having a uniform phase angle, and in the case of reception, the combination division/device receiving the antenna signal as the composite signal with uniform phase angle and dividing the antenna signal into the n carrier frequency radio signals which have essentially the same frequency and amplitude but different phase angles, the n carrier frequency radio signals being fed to the n ports of the base station.

2. The system as claimed in claim 1, wherein the combination/division device contains a Butler matrix which has n ports for the carrier frequency radio signals of the base station and m ports for the antenna signal or the composite signal, the composite signal or the antenna signal being fed to just one of the m ports, each remaining port being terminated with a terminating resistor.

3. The system as claimed in claim 2, wherein the radio signals of the base station have an essentially linearly rising phase angle with respect to one another.

4. The system as claimed in claim 1, wherein the antenna device contains just one port at which the antenna signal or the composite signal is present.

5. A system for a mobile radio system having a base station and an antenna device, comprising:
   a digital signal controller provided in the base station which, in the case of transmission, divides a digital signal to be transmitted into n individual digital signals which have essentially the same amplitude and frequency and the same phase angles, and which, in the case of reception, forms a composite reception signal with a uniform phase angle from the n individual signals;
   n ports provided in the base station;
   a device provided in the base station to convert the n individual signals of the signal controller into n analog, carrier-frequency radio signals for the n ports of the base station and vice versa, the carrier frequency radio signals having essentially the same frequency and amplitude, but different phase angles decoupled from one another;

a combination/division device having a port and arranged between the base station and the antenna device to connect the base station and the non-adaptive antenna device such that in the case of transmission, the carrier frequency radio signals are combined to form a composite signal which is provided to the port of the combination/division device and fed to the antenna device as an antenna signal, the composite signal having a uniform phase angle, and in the case of reception, the combination division/device receiving the antenna signal as the composite signal with uniform phase angle and dividing the antenna signal into the n carrier frequency radio signals which have essentially the same frequency, amplitude and phase angle, the n carrier frequency radio signals being fed to the n ports of the base station.

6. The system as claimed in claim 5, wherein the combination/division device contains at least one Wilkinson combiner.

7. The system as claimed in claim 5, wherein the antenna device contains just one port at which the antenna signal or the composite signal is present.

8. A system for a mobile radio system having a base station and an antenna device, comprising:

a digital signal controller provided in the base station which, in the case of transmission, divides a digital signal to be transmitted into n individual digital signals which have essentially the same amplitude and frequency but have different phase angles, and which, in the case of reception, forms a composite reception signal with a uniform phase angle from the n individual signals;

a device provided in the base station to convert the n individual signals of the signal controller into n analog, carrier-frequency radio signals and convert the carrier frequency radio signals into the individual signals of the signal controller, the carrier frequency radio signals having essentially the same frequency and amplitude, but different phase angles;

a combination/division device arranged between the base station and the antenna device to connect the base station and the antenna device such that in the case of transmission, the carrier frequency radio signals are combined to form a composite signal which is fed to the antenna device, the composite signal having a uniform phase angle, and in the case of reception, the combination division/device receiving the antenna signal as the composite signal and dividing the antenna signal into the n carrier frequency radio signals.

* * * * *